UNITED STATES PATENT OFFICE.

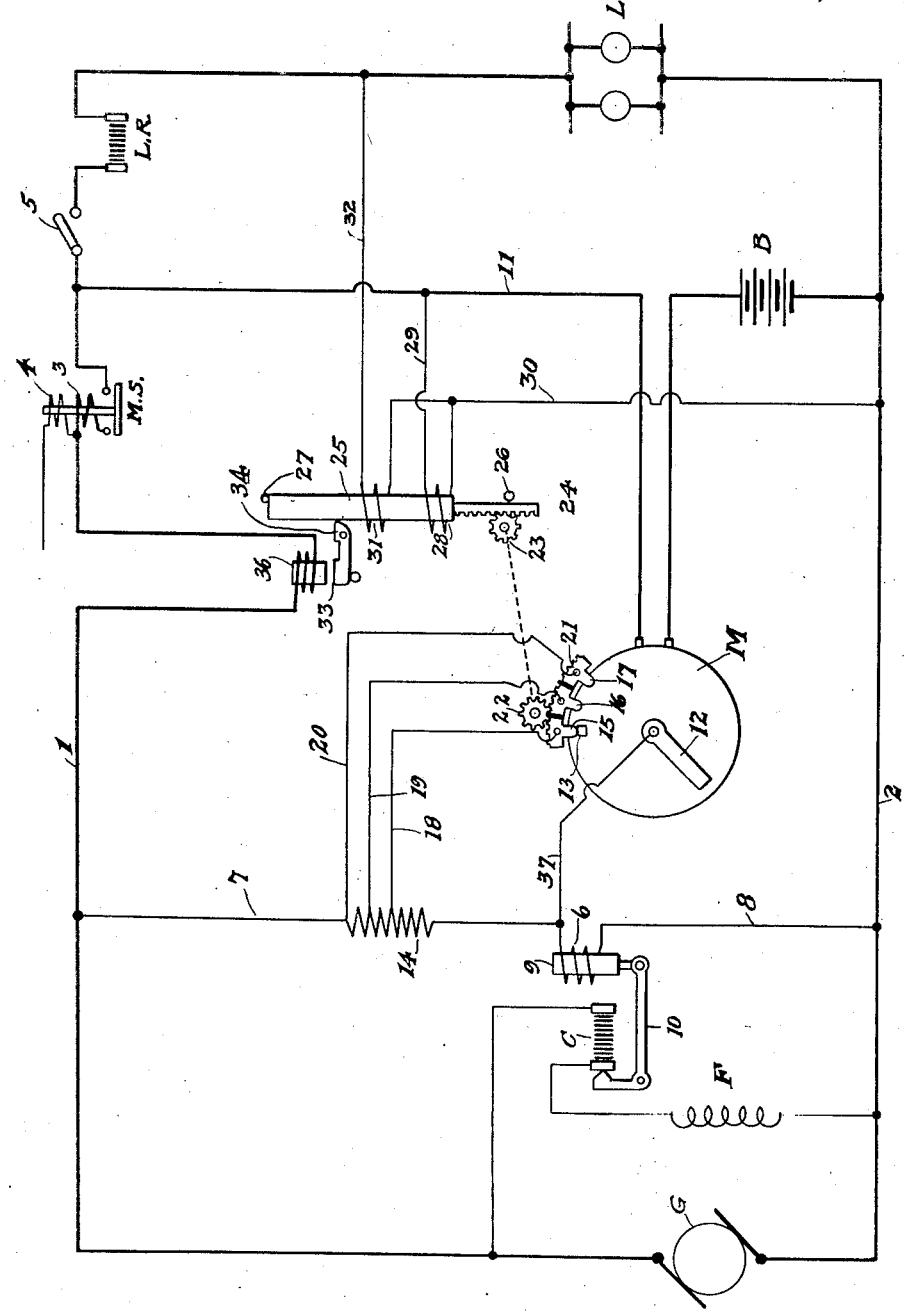

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,389,330.      Specification of Letters Patent.      Patented Aug. 30, 1921.

Application filed September 19, 1919. Serial No. 325,004.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and with respect to its more specific features, to an improved railway car lighting system including an axle-driven generator, a storage battery for charging thereby, lamps to be supplied by the generator or by the battery, an electro-responsive regulating means to govern the output of the generator in accordance with the needs of the system.

The major object of the invention is to provide an improved regulating apparatus or system of the character mentioned wherewith a standard of generator regulation is established after the completion of battery charging, at a reduced value dependent on the condition of the battery.

A further object is to combine a regulator for the purpose described, including an ampere hour meter or other means indicative of the state of battery charge by measurement of the charging and discharging current, with automatic means whereby the meter acts, after indicating a predetermined charge, to affect the generator regulator to an extent dependent on the internal condition of the battery for reducing the generator voltage to a value then correct to insure termination of the charging current.

A further object is to provide an improved car lighting system with a regulator possessing features of structural superiority and functional advantage.

Other objects and advantages will be in part noted hereinafter in connection with the following description of the accompanying drawing, which illustrates an exemplary embodiment of the invention and wherein is represented a simplified wiring diagram with a schematic showing of regulator parts conformable to the present invention.

As shown, there is provided a variable speed generator G to be driven by the car axle and having a shunt field winding F, which latter includes in series therewith a variable regulating resistance, such as a carbon pile C. The generator is arranged for connection by main lines 1 and 2 to charge a storage battery B and/or supply lamps L. A well-known form of main switch MS may be present to control the continuity of line 1 and is governed by a current coil 3 and a voltage coil 4 so designed as to close the break in line 1 when and while the voltage of the generator exceeds a predetermined value and to break the circuit when the generator voltage (for example, on account of train deceleration) falls below a predetermined value. A switch 5 is provided to control the circuit to the lamps, and of course additional individual switches for the separate lamps may be employed where desired. A lamp regulator LR includes a variable resistance is also employed to govern the voltage applied to the lamps from the generator or from the battery.

The electro-responsive regulating means for the generator, as shown, includes a voltage coil 6 connected across the lines 1 and 2 by leads 7 and 8 and acting by pull on a core 9 attached to bell crank lever 10 to vary the degree of compression of the carbon pile C in a manner whereby the voltage of the generator is maintained constant as against driven speed changes and against changes in the state of battery charge, save as will be noted hereinafter.

It has heretofore been proposed to associate an ampere hour meter connected in the battery branch and indicative of the state of battery charge by measurement of the charging and discharging current with a generator and regulator, these elements being so connected as to cause the meter, after a certain definite charge, to shunt a fixed step of resistance theretofore in series with a regulating coil, whereby the generator voltage is reduced. Certain defects, however, have inhered in such systems, notably on account of the failure thereof to take into consideration the actual condition of the battery at the end of the measured charge. The present invention aims to overcome certain of the defects referred to, among others.

An ampere hour meter M or other means relatively indicative of the state of battery charge by current measurement is connected in the battery branch 11 and may be provided with a movable pointer contact 12 rotatable counter-clockwise on charge, and clockwise on discharge, and the meter may also be provided with a terminal contact 13 arranged to be engaged by the contact 12 at the end of a predetermined ampere hours charge. A resistance 14 is arranged in series with the coil 6 in lead 7 and exerts a damping effect on said coil during the period of charging. In the system illustrated resistance 14 sets the regulating coil 6 to maintain constancy of generator voltage at a relatively high level during charge.

By the present invention an amount of the resistance 14 dependent on the condition of the battery, as indicated by the open circuit or discharging voltage thereof, under certain conditions, is short-circuited by the meter M at the end of charging, whereby regulating coil 6 is relatively strengthened and the generator voltage reduced accordingly. To accomplish this purpose, in the form of the figure, there is incorporated in or associated with the meter M a plurality of movable terminal contacts 15, 16 and 17 insulated from each other and respectively connected by lines 18, 19 and 20 to spaced (and, if desired, adjustable) points of the resistance 14. The three movable contacts mentioned may be arranged in segmental form having a rack 21 in mesh with a pinion 22, the latter being coöperatively associated with a corresponding pinion 23 meshing with a rack 24 on a core 25 of an automatic device operable under certain conditions to respond to the battery voltage on discharge or on open circuit. Stops 26 and 27 are provided to establish opposite limits of movement of the core 25. It will be observed that, dependent on the position of core 25 and the relative rotary position of pinions 23 and 22, the segment gear 21 will be moved to bring into engagement one or the other of the contacts 15, 16 and 17 with the stationary contact 13 of the meter, to thereby short-circuit a relatively small portion of the resistance 14, or more of said resistance, or all of said resistance, to lower the generator voltage to one of three (more or less) pre-selected limits at the end of charging.

Core 25 is arranged for control by the sole action of a voltage coil 28 connected across the battery by lines 29 and 30 when the battery is open-circuited, and for control by the action of coil 28 jointly with an assisting voltage coil 31 connected across the lamps by lines 32, 30 when the battery is on discharge. Coils 28 and 31 are designed to render coincident the pull on core 25 when said coils are active with the battery open-circuited or discharging to the lamps. In order, however, to prevent said coils from moving the core 25 in response to generator voltage, or while the battery is on charge, there may be provided a lever 33 pivoted adjacent an extremity 34, which wedges against the core 25 when the opposite end of the lever is attracted by a magnet 36 including a series winding in the line 1.

In operation, when the voltage of the generator is sufficient to close and maintain closed the automatic switch MS, lever 33 is actuated to engage and prevent movement of the core 25, and when the generator voltage is so low as to leave the switch MS open, lever 33 is freed and in turn frees core 25 for movement to an extent dependent on the battery voltage as measured by the coil 28 or the coils 28 and 31 jointly. Therefore, while the generator is disconnected through the main switch and the generator regulator functionally ineffective, core 25 is positioned in accordance with battery voltage and in turn positions the rack 21 to bring one of the contacts 15, 16 and 17 into engagement with the stationary meter contact 13. Assuming, for example, a normal battery at a train stop preceding the completion of charge (or other occurrence which allows the main switch MS to open), coils 28 and 31 act to indicate a relatively high normal battery voltage and the movable contact 15 is positioned to engage the contact 13. Thereafter, upon a re-building of generator voltage and re-closure of the main switch, charging continues until the meter movable contact 12 engages contact 13 and short-circuits, by lines 37 and 18, a pre-selected portion of the resistance 14 to lower the generator voltage to an amount correct to stop charging current to the normal battery. If, however, the battery has undergone change or deterioration, by, for example, the presence of a dead cell, such condition will be indicated by the coils 28 and 31, and core 25 will be balanced at a lower position to bring contact 16, or if need be, contact 17 into engagement with terminal contact 13, so that, upon a resumption of the generator voltage and the re-closure of the main switch, charging will continue to the predetermined amount, whereupon a greater amount of the resistance 14 will be short-circuited by lines 19 and 37, or all of the resistance short-circuited by lines 20 and 37 to reduce the generator voltage further and to a pre-selected amount correct for the then sub-normal condition of the battery.

It will thus be apparent that, at normal recurring intervals in the operation of the system, the apparatus is automatically set so that the standard of regulation of the generator to be maintained after charging will be proper for and proportionate to the actual condition and capacity of the battery, instead of an assumed condition.

It is to be understood that certain features of the invention are susceptible of modification and embodiment in systems other than that shown and wherein the generator regulator is of other character, and that such modifications and combinations can be effected without sacrifice of advantages of the present invention and without departure from the scope of the appended claims.

Having described my invention, what I claim as new and desire to secure by Letters Patent is:

1. In a car lighting system, in combination, a variable speed generator, a battery adapted for connection to be charged thereby, an electro-responsive regulator for the generator, and automatic means to affect said regulator for reducing the generator voltage after battery charging to a variable value dependent on the condition of said battery.

2. In combination, a variable speed generator, a battery adapted for connection to be charged thereby, an electro-responsive regulator for the generator acting when effective to maintain relative constancy of voltage as against speed changes, and means including an ampere hour meter to affect said regulator at the end of battery charging for reducing the generator voltage to an extent dependent on the battery voltage.

3. In combination, a variable speed generator, a battery adapted for connection to be charged thereby, an electro-responsive regulator for the generator, and means including an ampere hour meter indicative of the state of battery charge and a device indicative of battery voltage to affect said regulator at the end of battery charging to a variable extent controlled by said device.

4. In combination, a variable speed generator, a battery adapted for connection to be charged thereby, an electro-responsive regulator for the generator, an ampere hour meter connected to indicate the state of battery charge by current measurement, a device responsive at intervals to the voltage of said battery, and means including connections between said regulator and said meter and said device to affect said regulator at a time governed by said meter and to an extent governed by said device.

5. In combination, a variable speed generator, a battery adapted for connection to be charged thereby, an electro-responsive regulator for the generator, an ampere hour meter connected to indicate the state of battery charge by current measurement, a device responsive at intervals to the voltage of said battery, and means including mechanical and electrical connections between said regulator and said meter and said device to affect said regulator at a time governed by said meter and to an extent governed by said device for reducing the thereafter maintained generator voltage.

6. In combination, a variable speed generator, a battery adapted for connection to be charged thereby, electro-responsive regulating means including a coil tending to maintain constancy of generator voltage, a meter indicative of the state of battery charge by measurement of the charging and discharging current, automatic means indicative of the condition of the battery by measurement of the battery voltage on open circuit and on discharge, and means governed as to time by said meter and as to extent by said automatic means for affecting the action of said coil.

7. In combination, a variable speed generator having a shunt field winding, a battery adapted for connection to be charged by said generator, electro-responsive regulating means for said regulator including a voltage coil tending when effective to maintain relative constancy of generator voltage as against speed changes and as against gradual changes in the counter E. M. F. of the battery, a resistance adapted for inclusion in the circuit of said coil under certain conditions and for exclusion from said circuit under other conditions, automatic means effective during a period of ineffectiveness of said regulating means to control the amount of said resistance to be excluded therafter, and means indicative of the state of battery charge by current measurement to control the time of exclusion of such amount of said resistance.

8. In combination, a variable speed generator, a battery to be charged thereby, a regulator for said generator including a voltage coil acting when effective to maintain relative constancy of generator voltage as against speed changes and as against gradual changes in the counter E. M. F. of said battery, an ampere hour meter to affect said regulator after a predetermined charge for reducing the generator voltage to be maintained, and automatic means operative only in response to battery voltage to control the extent of the effect of said meter on said regulator.

9. In combination, a variable speed generator, a storage battery adapted for connection to be charged thereby, a regulator for said generator including a voltage responsive coil tending when effective to maintain relative constancy of generator voltage as against speed changes and as against gradual changes in the counter E. M. F. of said battery, a resistance adapted for inclusion in the circuit of said coil and variable exclusion from said circuit, automatic means including a coil responsive to battery voltage and effective only during a period of regulating ineffectiveness of said regulator to control the amount of said resistance to be excluded from the circuit of said voltage coil, and means including an ampere hour meter to control the time of exclusion of said amount of said resistance from said circuit.

10. In combination, a variable speed generator, a battery adapted for connection to be charged thereby, a regulator for said generator including a voltage-responsive coil connected across the generator mains, and means to insure the minimum effectiveness of said coil during an extended final period of battery charging and to insure one of a plurality of major degrees of effectiveness of said coil at the end of charging.

11. In combination, a variable speed generator, a battery adapted for connection to be charged thereby, a regulator for said generator including a voltage-responsive coil connected across the generator mains, a resistance to govern the relative effectiveness of said coil, and means to insure the maximum effectiveness of said resistance during an extended final period of battery charging and one of a plurality of minor degrees of effectiveness of said resistance dependent on the battery voltage after charging is completed.

In testimony whereof I affix my signature in the presence of two witnesses.

LEONARD A. WATSON.

Witnesses:
HELEN M. SEAMANS,
DAVID A. WOODCOCK.